UNITED STATES PATENT OFFICE.

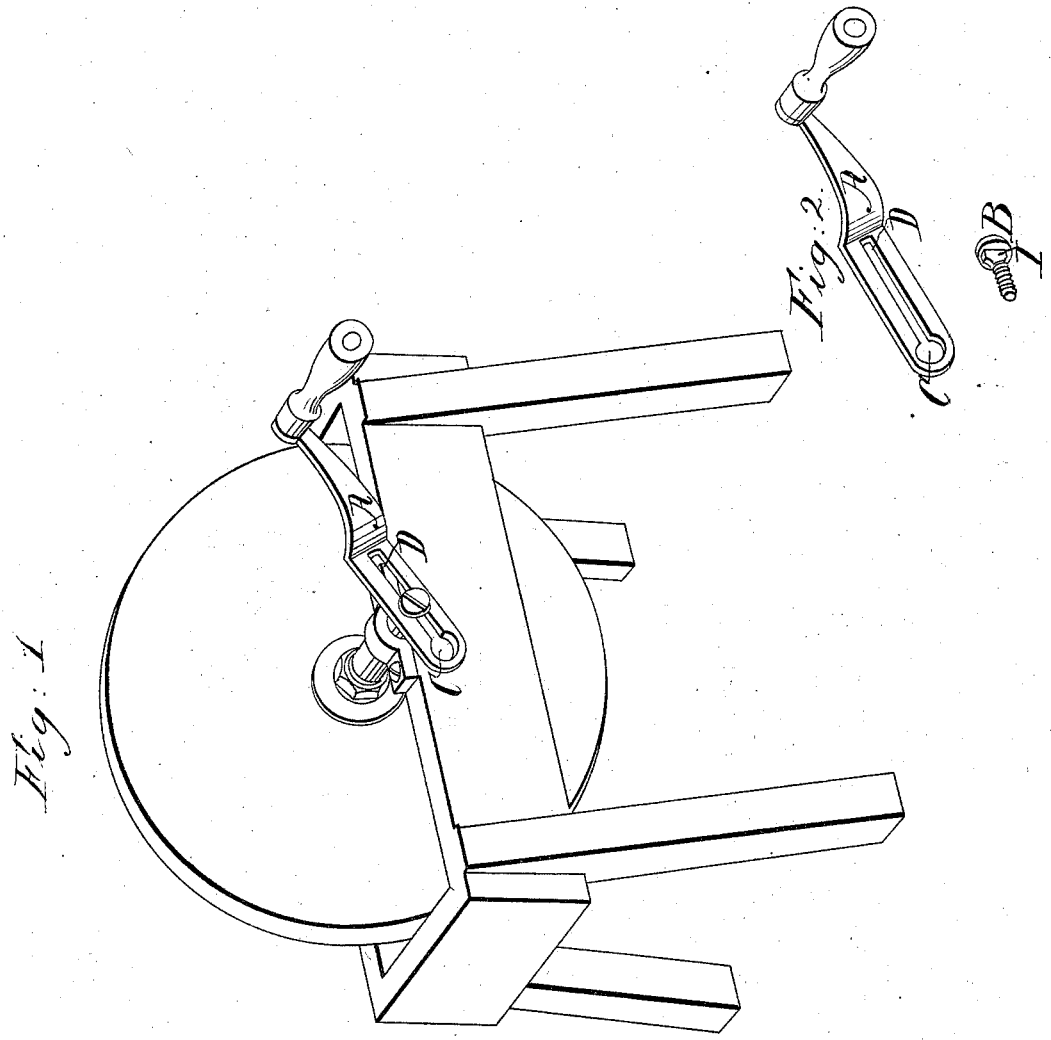

AMOS WESTCOTT, OF SYRACUSE, NEW YORK.

IMPROVEMENT IN ATTACHING CRANKS TO MACHINERY.

Specification forming part of Letters Patent No. 47,885, dated May 23, 1865.

*To all whom it may concern:*

Be it known that I, AMOS WESTCOTT, of the city of Syracuse, in the county of Onondaga and State of New York, have invented a new and Improved Mode of Attaching Cranks to Machinery; and I do hereby declare that the following is a full and exact description thereof, reference being had to the accompanying drawings and the letters of reference marked thereon.

Figure 1 represents a crank, attached in this instance to the shaft of a grindstone, although the same method of attachment is applicable to all ordinary cases where cranks are used.

B, Fig. 1, represents a screw which screws into the end of the shaft to which the crank is attached.

C represents a hole in the arm of the crank, and near its lower end, just large enough to pass over the head of the screw B.

D represents a slot cut into the arm of the crank from the hole C toward the handle as far as may be desirable, and of a width just sufficient to fit the shank of the screw B, which is flattened for a short distance between the head and where the threads terminate, as shown at I, Fig. 2, this distance being a little less than the thickness of the arm of the crank.

The screw being started into the end of the shaft, if the crank be so placed that the hole C shall pass over the head of the screw, and then the shank of the screw be slipped into the slot D in the crank, as shown in Fig. 1, and the crank then be turned so as to turn the screw B into the shaft, it will be seen that the crank will be securely fastened to the end of the shaft as soon as the screw B is turned in sufficiently for the head to press firmly upon the arm of the crank.

To take off the crank, all that is necessary is to turn the crank in the opposite direction with a slight jerk, when the screw B will be loosened and its shank will slip along in the slot D till the head can pass through the hole C, and the crank be removed.

I do not claim as my invention the use of a crank, in itself considered; but

What I do claim as my invention, and desire to secure by Letters Patent, is—

A crank constructed with the hole C and slot D, Fig. 1, in the arm thereof, in combination with the flat-shanked screw B, Fig. 1, by which it can be attached to the shaft, essentially as above described.

Dated Syracuse, September 28, 1864.

AMOS WESTCOTT.

Witnesses:
W. H. GIFFORD,
GEO. D. COWLES.